March 14, 1967 J. J. KING 3,309,682

MAGNETIC CORE INTERROGATION CIRCUITS FOR CORE ARRAY

Filed March 22, 1963 4 Sheets-Sheet 1

INVENTOR.
JOHN J. KING
BY
S. C. Yeaton
ATTORNEY

March 14, 1967 J. J. KING 3,309,682

MAGNETIC CORE INTERROGATION CIRCUITS FOR CORE ARRAY

Filed March 22, 1963 4 Sheets-Sheet 2

INVENTOR.
JOHN J. KING
BY
S. C. Yeaton
ATTORNEY

March 14, 1967 J. J. KING 3,309,682

MAGNETIC CORE INTERROGATION CIRCUITS FOR CORE ARRAY

Filed March 22, 1963 4 Sheets-Sheet 3

INVENTOR.
JOHN J. KING
BY S. C. Yeaton
ATTORNEY

INVENTOR.
JOHN J. KING
BY
S.C. Yeaton
ATTORNEY

United States Patent Office 3,309,682
Patented Mar. 14, 1967

3,309,682
MAGNETIC CORE INTERROGATION CIRCUITS FOR CORE ARRAY

John J. King, Jericho, N.Y., assignor to Sperry Rand Corporation, Great Neck, N.Y., a corporation of Delaware Filed Mar. 22, 1963, Ser. No. 267,278
8 Claims. (Cl. 340—174)

Figure 1:
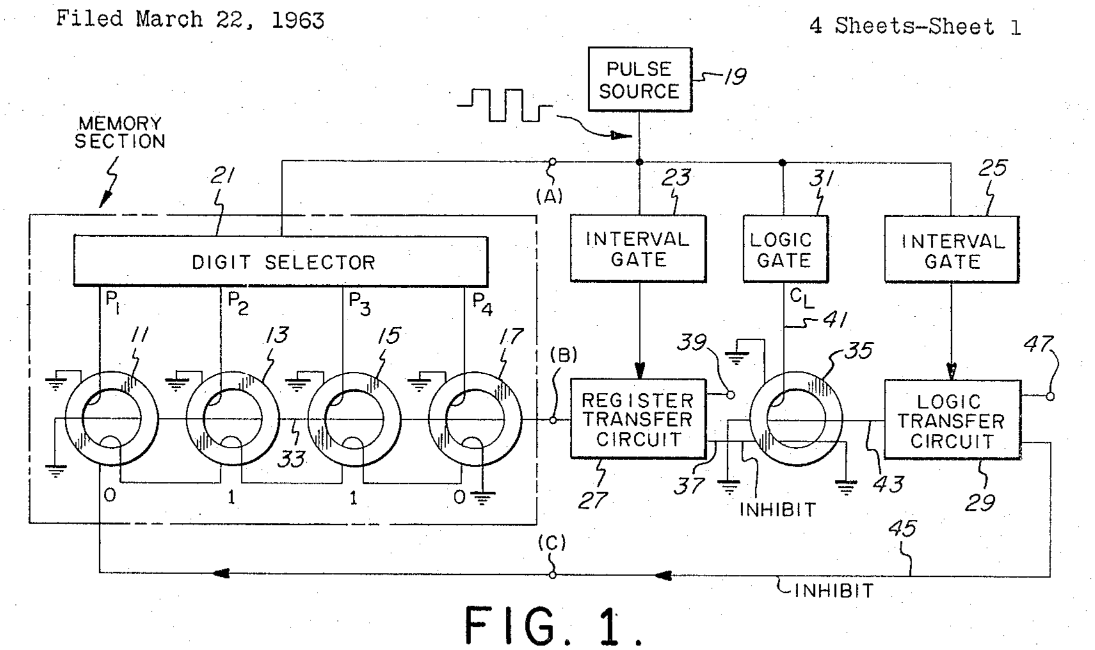

This invention relates to logic circuits and more particularly to high speed logic circuits employing magnetic cores.

Conventional circuits for performing Boolean operations on stored data frequently utilize combinations of vacuum tubes or diodes to perform logical functions. Such elements, however, require complex driving circuits so that fault-location becomes a formidable problem in large installations. Furthermore, these elements deteriorate with age so that failures occur frequently and add to the maintenance problem.

A system for using magnetic memory cores in such installations has been proposed by Ladimer J. Andrews in an article appearing on pages 39–46 of the Proceedings of the Eastern Joint Computer Conference for December 1956 and entitled: "Technique for Using Memory Cores as Logical Elements." This technique involves the use of magnetic register cores in which information is stored, and magnetic logic cores in which Boolean logic is performed on the information so stored. Information is interchanged between the register and logic cores through a single transfer circuit which delays the flow of information in either direction for one pulse interval. Therefore interrogation of each register core requires four successive pulse intervals: a first interval in which information is read out of a register core and into the transfer circuit; a second interval in which the information is read out of the transfer circuit and into the logic core; a third interval in which the information is read out of the logic core and into the transfer circuit; and a fourth interval in which the information is read out of the transfer circuit and back into the register core. The complete cycle must be performed on one register core before interrogation of the next core can be started.

The present invention preserves the reliability and simplicity of the Andrews technique while at the same time significantly increasing the speed of operation.

Therefore, it is an object of the present invention to provide a logic circuit capable of high speed operation.

It is another object of the invention to provide a high speed logic circuit of high reliability.

These and other objects are achieved by providing an inhibit core logic system in which the interrogation of one register core can be started before the interrogation cycle of a previously-read register core is completed.

Figure 2:
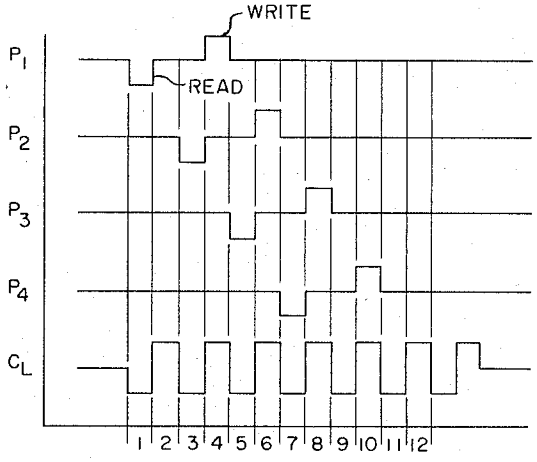

The principles of operation of the invention can best be understood by referring to the drawings in which:

FIG. 1 is a block diagram of a double speed logic circuit employing the principles of the invention, FIG. 2 is a diagram illustrating the waveforms used for serially interrogating the register cores of the circuit of FIG. 1.

Figure 3:
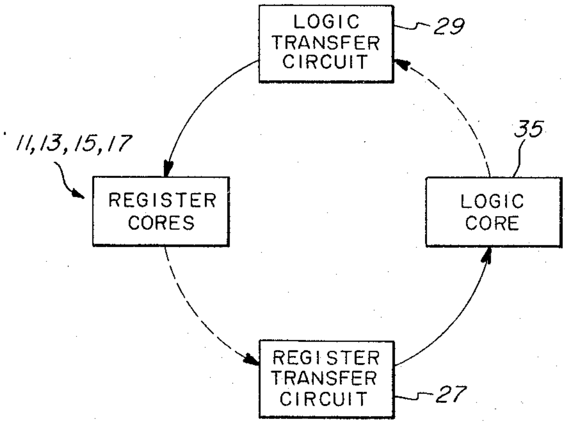
Figure 4:
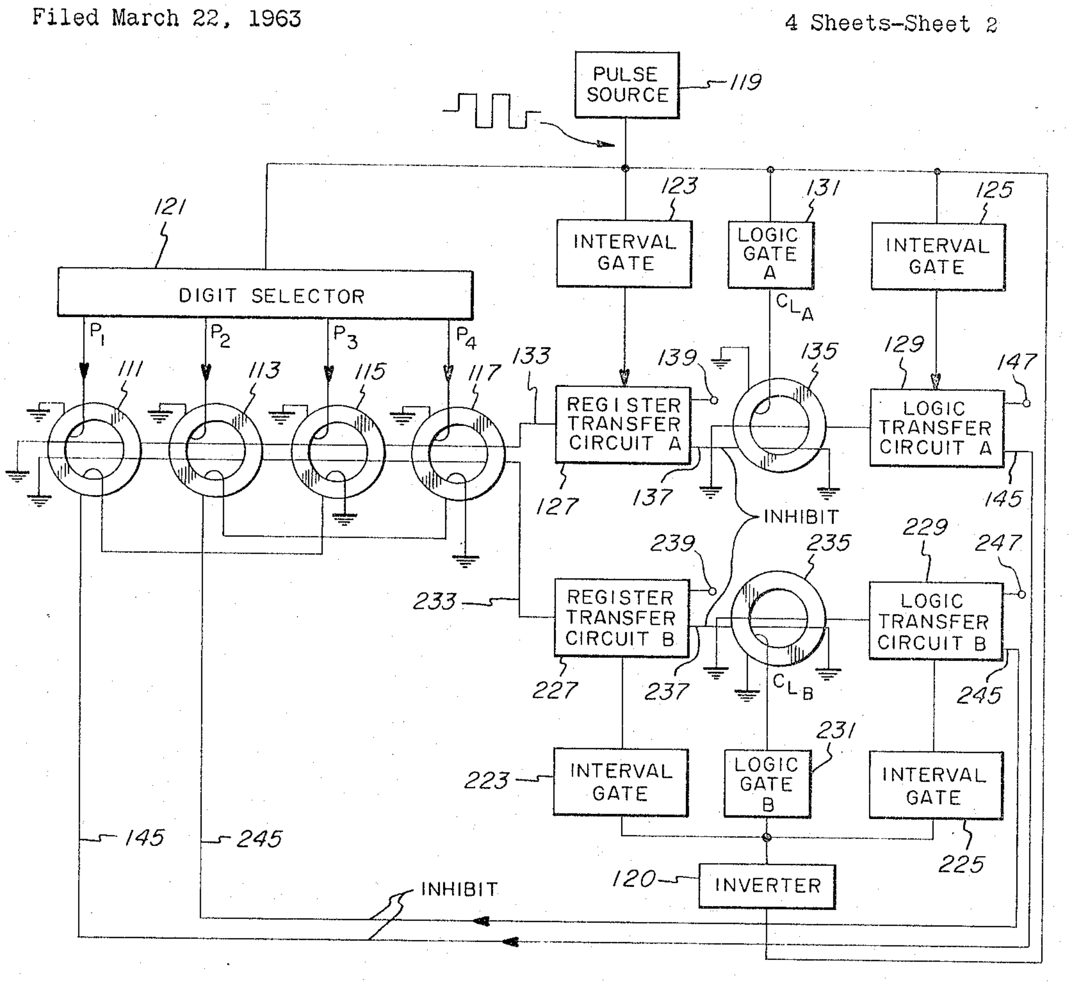
Figure 5:
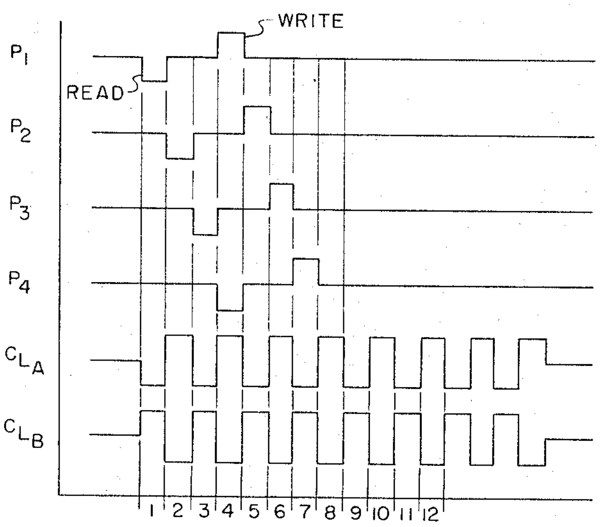
Figure 6:
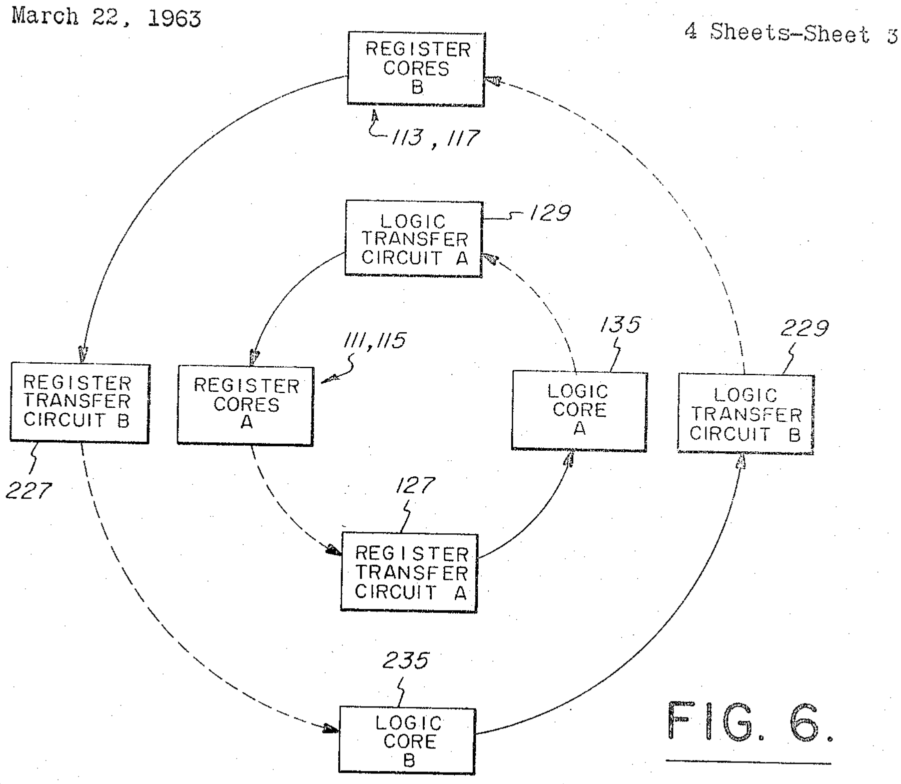
Figure 7:
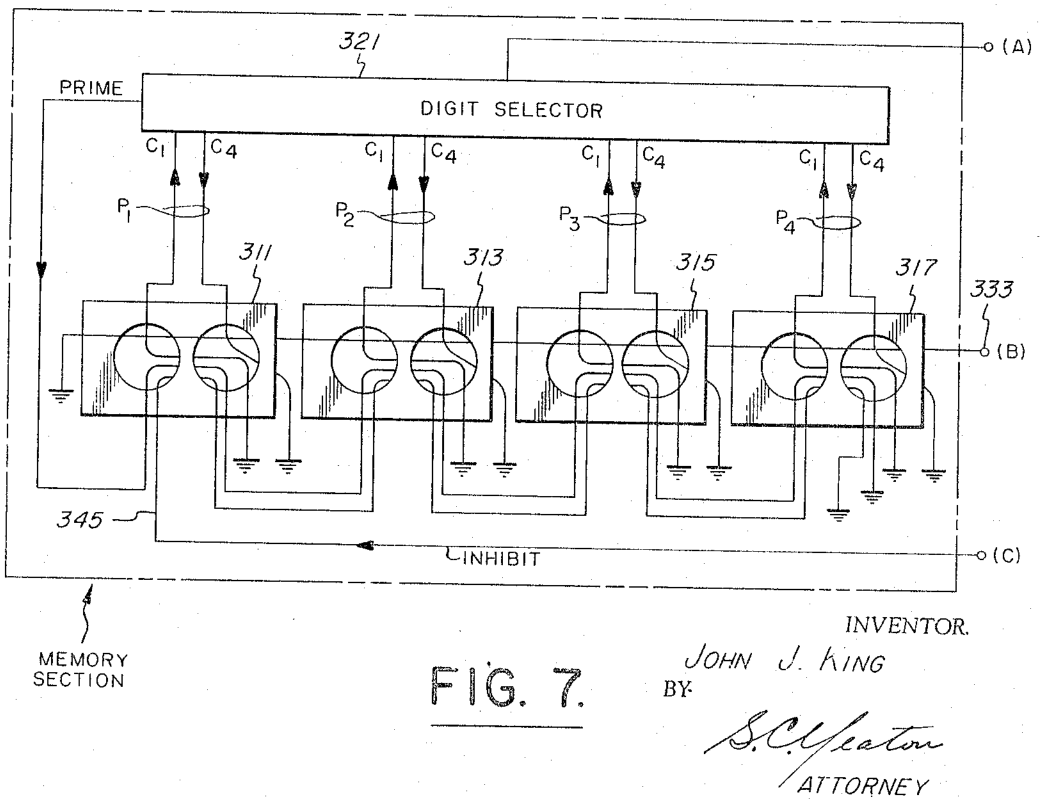
Figure 8:
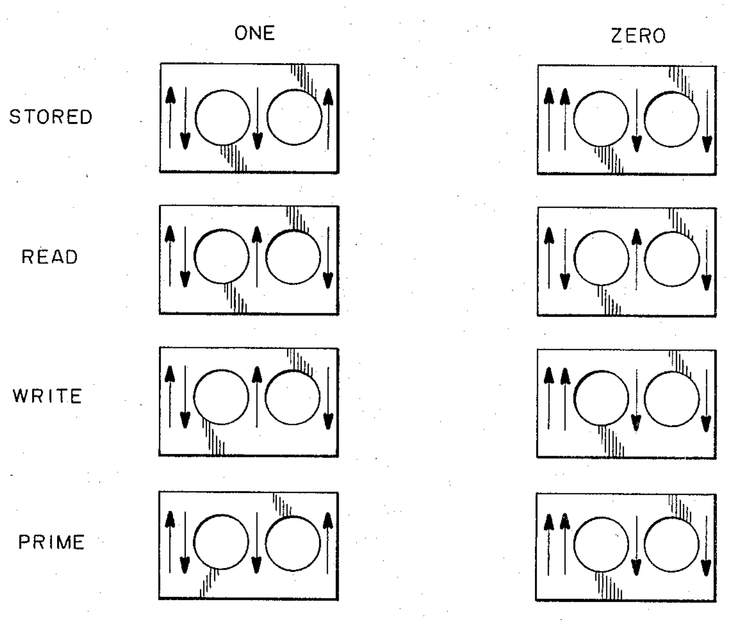
Figure 9:
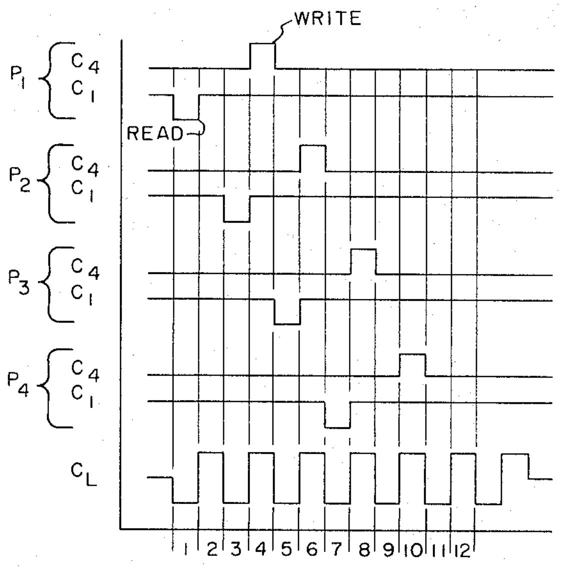

FIG. 3 is a diagram useful in explaining the operation of the circuit of FIG. 1, FIG. 4 is a block diagram of a quadruple speed logic circuit employing the principles of the invention, FIG. 5 is a diagram illustrating the waveforms used for serially interrogating the register cores of the circuit of FIG. 4, FIG. 6 is a diagram useful in explaining the operation of the circuit of FIG. 4, FIG. 7 is a block diagram of a bi-aperture core memory section useful in practicing the invention, FIG. 8 is a diagram illustrating the magnetic flux patterns used in the register cores of FIG. 7, and FIG. 9 is a diagram illustrating the waveforms used for serially interrogating the register cores of the circuit of FIG. 7.

FIG. 1 illustrates a double speed logic circuit employing four toroidal ferrite register cores: 11, 13, 15 and 17. The common pulse source 19 produces a square wave output voltage to trigger timing pulse generators so as to establish the digit transfer cycle.

These timing pulse generators include a digit selector 21 that serially interrogates the various register cores; interval gates 23 and 25 that provide signals for inhibit pulses to the transfer circuits 27 and 29 during the WRITE intervals of the transfer cycle; and a logic gate 31 that provides alternate READ and WRITE signals for each successive interval of the transfer cycle.

The digit selector 21 is essentially a switching circuit that conveys the pulses from the pulse source to the various register cores according to the pattern illustrated in FIG. 2. The design of such circuits is straightforward and utilizes well known techniques.

A register sense wire 33 is magnetically linked to each register core and conveys a switching pulse to the register transfer circuit 27 whenever the magnetic field in a register core changes from one stable state to the other.

The register transfer circuit functions to read out information from the register cores, delay or "hold" this information, and set up inhibiting signals that can affect the switching of a logic core 35. The transfer circuit is basically a flip-flop constructed so that a WRITE signal received from the interval gate normally appears as an inhibit signal on the logic core inhibit wire 37. However, a signal received along the sense wire 33 switches the transfer circuit flip-flop so that the following WRITE pulse received from the interval gate appears only at the terminal 39. The termination of the WRITE pulse returns the flip-flop to the normal condition.

Transfer circuits suitable for this purpose are disclosed in Patent 3,040,986 issued to Ladimer J. Andrews on June 26, 1962.

The logic core 35 is magnetically coupled to the logic inhibit wire 37 and to a logic gate wire 41. These two wires are threaded through the logic core so as to produce opposing magnetomotive forces during WRITE intervals. Thus an inhibiting pulse from the transfer circuit 27 can prevent a simultaneous logic gate WRITE pulse from switching this core. A logic sense wire 43 is also coupled to the logic core and serves to convey switching pulses to the logic transfer circuit 29 whenever the magnetic state of the logic core is reversed. The logic transfer circuit is identical to the register transfer circuit. WRITE pulses from the interval gate 25 normally appear on the register inhibit wire 45. A switching pulse, received along the sense wire 43 during a READ interval, however, switches the flip-flop in the logic transfer circuit 29 so that the succeeding WRITE pulse from the interval gate appears only at the terminal 47. The register inhibit wire 45 is magnetically linked to each register core so that an inhibit pulse prevents a concurrent digit selector WRITE pulse from switching a register core.

The operation of the invention can best be understood by referring to FIG. 1 and FIG. 2.

A stored ONE may be defined as the flux state that will be switched by a READ pulse, and a stored ZERO may be defined as the flux state that will not be switched by a READ pulse.

Assume now that the register cores contain the word 0110 as indicated in FIG. 1.

Since the core 11 is in the stored ZERO state, the READ pulse $P_1$ occurring in interval (1) cannot switch the core. No voltage will be induced in the sense wire 33 and the register transfer circuit will remain in the normal condition. In the next pulse interval (2) a WRITE pulse is supplied by the interval gate 23 and appears as in inhibit pulse on the wire 37. Simultaneously, the WRITE pulse is applied to the logic core from the logic gate. This pulse, however, cannot switch the logic core in the presence of the inhibit signal and the core remains in the ZERO state.

On the succeeding READ pulse (3), both the logic core and the register core 13 are interrogated. The information in the logic core is transferred to the logic transfer circuit at the same time that the information in the register core 13 is transferred to the register transfer circuit. Since the logic core was in the ZERO state, the logic transfer circuit remains in the normal state; since the register core 13 contained a stored ONE, the register transfer circuit is switched from its normal state.

In WRITE pulse interval (4), information is transferred to the logic core at the same time that the register core 11 is placed in its original magnetic state. The logic transfer circuit remains in its normal state so that the WRITE pulse during interval (4) provides a register inhibit pulse which retains the core 11 in the ZERO state. Simultaneously, however, the logic core is switched to the ONE state since the register transfer circuit had been switched from its normal state and the WRITE pulse from the interval gate 23 appears only at the terminal 39.

During READ pulse interval (5) pulse $P_3$ interrogates register core 15 and the clock pulse from the logic gate interrogates the logic core. Since both of these cores were in the ONE state, both transfer circuits are switched. During the next WRITE interval (6) both the register core 13 and the logic core are switched to the ONE state since the transfer circuits had been switched and could not produce inhibiting signals. Core 13 now has been returned to the state it exhibited before the interrogation cycle.

Similar events occur as the interrogation proceeds so that cores 15 and 17 are eventually returned to their original states. Signals from either the terminal 39 or the terminal 47 can be used to actuate readout indicating devices or other utilization circuits. It will be obvious to those skilled in the art that many variations of the basic circuit can be made. In some instances, for example, it may be desired to reset the register cores so that after interrogation they contain information that is the inverse of the formation originally stored. This can be accomplished by connecting the logic inhibit wire to the terminal 39 rather than terminal 37 or by connecting the register inhibit wire to the terminal 47.

Because the circuit can process two bits of information simultaneously, a square wave of timing voltage can be employed whereby a first bit of information can be written back into the array immediately after a second bit of information is read out of the array. Prior art circuits require a timing wave having a time delay between READ and WRITE pulses since a given bit of information must be written back into the appropriate register core before a second core is interrogated. The invention thus provides readout means in which the interrogation cycles for the various cores are made to overlap rather than to occur one at a time.

The mode of operation can be readily visualized by referring to FIG. 3. During each READ pulse interval, the information advances as indicated by both dashed arrows. During each WRITE pulse interval, the information advances as indicated by both solid arrows. Thus on a READ pulse, information is transferred from a register core to the register transfer circuit while at the same, the information in the logic core is transferred to the logic transfer circuit. During the following WRITE pulse interval, information is advanced from the logic transfer circuit back to the appropriate register core while information in the register transfer circuit is being transferred to the logic core.

FIG. 4 illustrates a quadruple speed circuit employing the principles of the invention.

The circuit of FIG. 4 employs pairs of transfer circuits and pairs of logic cores both arranged in parallel fashion and designated as A and B channels for convenience.

The A channel is operatively associated with the register cores 111 and 115 whereas the B channel is associated with the cores 113 and 117. Thus the register sense wire 133 and the register inhibit wire 145 are magnetically coupled to the register cores 111 and 115 only; the register sense wire 233 and the register inhibit wire 245 are magnetically coupled to the register cores 113 and 117 only.

Channels A and B are driven in phase opposition by feeding the square wave signal from the pulse source 119 directly to the gates 123, 125 and 131, but passing the square wave signal through the pulse inverter 120 before passing it to the channel B gates 223, 225, and 231. Thus the interval gates of one channel supply pulses to the associated transfer circuits only during the interval that the interval gates of the opposite channel are inactive. Similarly, one logic gate applies a READ pulse at the same time that the other logic gate supplies a WRITE pulse.

The digit selector 121 provides a sequence of READ and WRITE pulses in response to the square wave output of the pulse source 119. The particular pulse sequence can be visualized by referring to FIG. 5. The design of such digit selectors is straightforward and well known in the art.

The operation of this embodiment of the invention can be understood by referring to FIGS. 4 and 5 and considering the transfer of information for several pulse intervals.

During pulse interval (1):

Information from the register core 111 is transferred to the register transfer circuit 127.

During pulse interval (2):

Information originally stored in the core 111 is transferred from the register transfer circuit 127 to the logic core 135;

Information stored in the register core 113 is transferred to the register transfer circuit 227.

During pulse interval (3):

Information originally stored in the core 111 is transferred from the logic core 135 to the logic transfer circuit 129;

Information originally stored in the register core 113 is transferred from the register transfer circuit 227 to the logic core 235;

Information from the register core 115 is transferred to the register transfer circuit 127.

During pulse interval (4):

Information originally stored in core 111 is transferred from the logic transfer circuit 129 back to the core 111;

Information originally stored in core 113 is transferred from the logic core 235 to the logic transfer circuit 229;

Information originally stored in the register core 115 is transferred from the register transfer circuit 127 to the logic core 135;

Information stored in the register core 117 is transferred to the register transfer circuit 227.

The interrogation process proceeds in this fashion until all of the cores have been returned to the magnetic state they exhibited before the interrogation began.

It can be seen that as many as four transfers of information can be accomplished during a single pulse interval, and that the entire interrogation process for the four register cores can be accomplished in just seven pulse intervals.

The mode of operation of the circuit of FIG. 4 can be readily visualized by referring to FIG. 6. The inner circle in this diagram represents the flow of information in channel A, and the outer circle represents the flow of information in channel B. Information is transferred as indicated by the four dashed arrows during one pulse interval and transferred as indicated by the four solid arrows on the next pulse interval.

It will be appreciated that although only four register cores have been shown in the circuits of FIGS. 1 and 4 for purposes of illustration, any suitable number of cores may be used in practicing the invention.

Information can be conveniently read out of the register cores by observing the signals appearing at terminals 147 and 247. An OR circuit may be connected to these terminals if desired. The output of the OR circuit may then be used to drive a suitable indicator. Terminals 139 and 239 may also be used in a similar fashion.

Although the logic inhibit wires are shown connected to terminals 137 and 237, it will be appreciated that circumstances may arise in which it may be desired to reset the register cores with information that is the inverse of the information originally stored. This can readily be accomplished by connecting these inhibit wires to the terminals 139 and 239 respectively. Alternatively, the same result may be accomplished by connecting the register inhibit wires to the terminals 147 and 247.

Furthermore, although toroidal ferrite cores have been illustrated, bi-aperture cores may be used in circuits employing the invention if so desired.

FIG. 7 illustrates a bi-aperture core memory section that may be used in place of the toroidal core memory section of FIG. 1. Four register cores 311, 313, 315, and 317 are illustrated for purposes of explanation. A digit selector 321 is triggered from the square wave pulse source through connecting point (A). A sense wire 333 is coupled to the outer saturable leg of each register core and serves to convey switching signals to the register transfer circuit through the connecting point (B). The inhibit wire 345 is coupled to the center leg of each register core so as to establish downwardly directed magnetic flux when this wire is traversed by an inhibit signal flowing from the logic transfer circuit through the connecting point (C).

A prime wire also links the center leg of each register core so that a prime pulse passing through this wire establishes flux downwardly in each center leg. The prime pulse is used to prepare the cores for the interrogation cycle. The need for a priming function will become apparent as the discussion proceeds.

The digit selector 321 provides READ and WRITE pulses to the register cores and may also be used to provide the prime pulse if desired. READ and WRITE pulses are supplied to each core through a pair of wires. A first wire, $C_1$ in each case, supplies a pulse during the first READ pulse interval for the particular core. This wire is coupled to the core so as to cause flux to flow upwardly in the center leg. A second wire, $C_4$, in each case, supplies a pulse during the WRITE pulse interval for the particular core. This wire is coupled to the core so as to cause flux to flow downwardly in the outer saturable leg of the core when a WRITE pulse traverses the wire.

The art is well versed in techniques for generating square wave current pulses occurring in the sequence required for this interrogation cycle.

FIG. 8 illustrates the flux patterns produced in the register cores of FIG. 7 during the interrogation cycle.

Information is stored in a register core in the form of a binary ONE or a binary ZERO. Binary ONE is represented by a flux pattern in which flux flows downwardly in the center leg and upwardly in the outer saturable leg. Binary ZERO is represented by a flux pattern in which flux downwardly in both saturable legs.

Information is read out of the core by applying a $C_1$ pulse to the core which causes flux in the center leg to flow upwardly. If the core contained a stored ONE, the flux direction in the outer saturable leg is reversed and a voltage is induced in the sense winding. If the core contained a stored ZERO, however, the flux in the outer saturable leg already was directed downwardly. The reversal of flux in the center leg has no significant effect on the flux in the outer leg and no voltage is induced in the sense wire.

When the information is written back into the core, pulse $C_4$ establishes a downwardly directed magnetomotive force in the outer saturable leg. If a ONE is to be written back into the core, this causes no flux reversal. If a ZERO is to be written back into the core, however, the WRITE pulse is accompanied by an inhibit pulse which causes the flux in the center leg also to flow downwardly. This restores the core to the ZERO state.

In order to restore appropriate cores in the array to the stored ONE state, a prime pulse is next applied to all of the cores. This has no effect on the cores containing stored ZEROES, but resets the cores that are to contain stored ONES and thus prepares all of the cores for another interrogation cycle.

The interrogation cycle can be understood by referring to FIG. 7 and to FIG. 9. During the pulse interval (1), information is read out of the core 311 and into the to FIG. 7 and to FIG. 9. During pulse interval (2), this information is written into the logic core 35. During the pulse interval (3), the information in the core 313 is read into the register transfer circuit by pulse $P_2C_1$ and the information in the logic core is read into the logic transfer circuit 47.

In the following pulse interval (4), the information in the logic transfer circuit is written back into the core 311 from which it originated, and the information from the register transfer circuit is written into the logic core. The cycle proceeds in this fashion until all of the cores have been interrogated. The cycle is then completed by passing a prime pulse through the prime wire to restore the core to their original state.

Bi-aperture register cores may be used with the quadruple speed logic of FIG. 4 in a similar fashion.

It will be appreciated that many variants of the particular bi-aperture core circuits may be employed, since binary ZERO and binary ONE may be defined by different flux patterns than those illustrated.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. The combination comprising an array of register cores, means to provide trains of alternate READ and WRITE timing pulses, means to switch the first READ pulse in a given train and the second following WRITE pulse in that train to a first register core in said array, means to switch succeeding READ pulses sequentially to the individual remaining register cores and to switch succeeding WRITE pulses in the same sequence to the individual remaining register cores, a register transfer circuit coupled to receive information read out of said array in response to a READ pulse, a logic core coupled to receive information from said register transfer circuit in response to a WRITE pulse, and a logic transfer circuit coupled to receive information read out of said logic core in response to a READ pulse, said logic transfer circuit being further coupled to the cores in said array so as to transfer information from said logic core back into said array.

2. A readout circuit comprising an array of register cores, a logic core, a source of alternate READ and WRITE pulses suitable for reading information out of a given core and permitting information to be read into a given core respectively; means to apply READ and WRITE pulses to the logic core, means to apply successive READ pulses to individual register cores in a given sequence, means to apply a WRITE pulse to a given register core in the third pulse interval after a READ pulse has been applied to that core, a register transfer circuit coupled to receive information from the register array during a READ pulse interval and to transfer this information to the logic core in the succeeding WRITE pulse interval, a logic transfer circuit coupled to receive information from the logic core during a READ pulse interval, and to transfer the same information to a register core in the succeeding WRITE pulse interval.

3. In combination, an array of magnetic register cores, a magnetic logic core, a source of alternate READ and WRITE pulses capable of reading information out of a magnetic core and permitting information to be read into a magnetic core respectively, means to permit each READ and WRITE pulse to be applied to the logic core, means to couple successive READ pulses sequentially to individual register cores, a register transfer circuit coupled to receive a bit of information from a register core during a given READ pulse, said register transfer circuit being also coupled to the logic core to transfer the same bit of information to the logic core during the following WRITE pulse, and a logic transfer circuit coupled to the logic core to receive the bit of information during the next READ pulse, said logic transfer circuit being also coupled to apply its output signal to each of the register cores, and means to apply the next occuring WRITE pulse to the register core previously actuated by said given READ pulse.

4. The combination comprising:

(a) a source of square wave timing pulses,
(b) a digit selector connected to receive timing pulses from said square wave source,
(c) logic gate means also connected to receive timing pulses from said square wave source,
(d) magnetic core logic means coupled to receive READ and WRITE pulses from said gate means in synchronism with said timing pulses,
(e) an array of magnetic register cores coupled to receive READ and WRITE pulses from said digit selector,
(f) said digit selector being constructed to provide READ pulses to successive register cores simultaneously with the READ pulses supplied to the logic core means by the logic gate means,
(g) register transfer means coupled to receive and hold information read out of the array of register cores during a READ pulse interval, and
(h) logic transfer means coupled to receive and hold information read out of the magnetic core logic means during a READ pulse interval,
(i) said register transfer means being further coupled to the magnetic core logic means so as to transfer information held in the transfer circuit to the logic means during WRITE pulse intervals,
(j) said logic transfer means being further coupled to the array of register cores so as to transfer information held in the transfer circuit back to the appropriate register core during WRITE pulse intervals.

5. The combination comprising:

(a) an array of register cores,
(b) a source of square waves constituting alternate, equally-spaced, READ and WRITE timing pulses,
(c) a digit selector triggered by said square wave source and coupled to each register core in said array so as to interrogate serially each core in response to said timing pulses,
(d) a register sense wire magnetically coupled to each register core so as to provide a switching signal whenever the magnetic state of a register core is reversed by a READ pulse,
(e) a register transfer circuit connected to said register sense wire for generating an inhibit signal during a WRITE pulse interval unless a switching signal was produced in the sense wire during the previous READ pulse interval,
(f) a magnetic logic core coupled to receive READ and WRITE pulses from said square wave source and inhibit signals from said register transfer circuit,
(g) a logic sense wire magnetically coupled to the logic core so as to provide a switching signal whenever the magnetic state of the core is reversed by a READ pulse,
(h) a logic transfer circuit connected to said logic sense wire for generating an inhibit signal during a WRITE pulse interval unless a switching signal was produced on the sense wire during the previous READ pulse interval, and
(i) a register inhibit wire magnetically coupled to each register core for conveying the inhibit signals produced by said logic transfer circuit to the register cores.

6. In combination:

(a) an array of bi-aperture magnetic register cores,
(b) a source of square waves constituting alternate, equally-spaced, READ and WRITE timing pulses,
(c) a digit selector triggered by said square wave source and coupled to each register core in said array,
(d) a register sense wire magnetically coupled to each register core so as to provide a switching signal whenever the magnetic state of a register core is reversed by a READ pulse,
(e) a register transfer circuit connected to said register sense wire for generating an inhibit signal during a WRITE pulse interval unless a switching signal was produced in the sense wire during the previous READ pulse interval,
(f) a magnetic logic core coupled to receive READ and WRITE pulses from said square wave source and inhibit signals from said register transfer circuit,
(g) a logic sense wire magnetically coupled to the logic core so as to provide a switching signal whenever the magnetic state of the core is reversed by a READ pulse,
(h) a logic transfer circuit connected to said logic sense wire for generating an inhibit signal during a WRITE pulse interval unless a switching signal was produced on the sense wire during the previous READ pulse interval,
(i) a register inhibit wire magnetically coupled to each register core for conveying the inhibit signals produced by said logic transfer circuit to the register cores, and
(j) a prime wire magnetically coupled to each register core so as to establish predetermined flux patterns in the register cores prior to interrogation of the array.

7. In combination:

(a) an array of bi-aperture magnetic register cores,
(b) a source of square waves constituting alternate, equally-spaced, READ and WRITE timing pulses,
(c) a digit selector triggered by said square wave source, said digit selector being magnetically coupled to each register core so as to provide upwardly directed flux in the center leg of the core during appropriate READ pulse intervals and downwardly directed flux in the outer saturable leg of the core during appropriate WRITE pulse intervals,
(d) a register sense wire magnetically coupled to the outer saturable leg of each register core,
(e) a register transfer circuit connected to said register sense wire for generating an inhibit signal during a WRITE pulse interval unless a switching signal was produced in the sense wire during the previous READ pulse interval, (f) a magnetic logic core coupled to receive READ and WRITE pulses from said square wave source and inhibit signals from said register transfer circuit, (g) a logic sense wire magnetically coupled to the logic core, (h) a logic transfer circuit connected to said logic sense wire for generating an inhibit signal during a WRITE pulse interval unless a switching signal was produced on the sense wire during the previous READ pulse intervals, (i) a register inhibit wire magnetically coupled to each register core for conveying the inhibit signals produced by said logic transfer circuit to the register cores, and (j) a prime wire magnetically coupled to the center leg of each register core so as to establish downwardly directed magnetic flux in these legs prior to interrogation of the array.

8. In combination:

(a) an array of register cores, (b) a source of square waves constituting alternate, equally-spaced READ and WRITE timing pulses, (c) a pulse inverter connected to said source of square waves to provide a source of out-of-phase READ and WRITE timing pulses, (d) a digit selector triggered by said square wave source and coupled to each register core so as to interrogate serially each core in response to the timing pulses from said square wave source, (e) a first register sense wire magnetically coupled to alternate register cores, (f) a second register sense wire magnetically coupled to the remaining register cores, (g) first and second register transfer circuits connected to the first and second register sense wires respectively, said first register transfer circuit being connected to receive WRITE pulses from said square wave source, said second register transfer circuit being connected to receive WRITE pulses from the pulse inverter, (h) a first magnetic logic core coupled to receive READ and WRITE pulses from said square wave source and inhibit signals from the first register transfer circuit, (i) a second magnetic logic core coupled to receive READ and WRITE pulses from the pulse inverter and inhibit signals from the second register transfer circuit, (j) first and second logic sense wires magnetically coupled to the first and second logic cores respectively, (k) first and second logic transfer circuits connected to said first and second logic sense wires respectively, said first logic transfer circuit being connected to receive WRITE pulses from said square wave source, said second logic transfer circuit being connected to receive WRITE pulses from the pulse inverter, and (l) first and second register inhibit wires connected to said first and second logic transfer circuits respectively, said first register inhibit wire being magnetically coupled to the same register cores that are coupled to said first register sense wire, said second register inhibit wire being magnetically coupled to the remaining register cores.

References Cited by the Examiner

UNITED STATES PATENTS

| | | | |
|---|---|---|---|
| 3,059,226 | 9/1962 | Einsele | 340—174 |
| 3,075,183 | 1/1963 | Warman et al. | 340—174 |

BERNARD KONICK, *Primary Examiner.*

G. LIEBERSTEIN, S. M. URYNOWICZ, *Assistant Examiners.*